United States Patent [19]

Cole

[11] 4,205,223

[45] May 27, 1980

[54] HEATING CIRCUITS FOR DETECTION OF LOCALIZED OVERHEATING

[75] Inventor: Graham M. Cole, Lymington, England

[73] Assignee: Dreamland Electrical Appliances Limited, Southhampton, England

[21] Appl. No.: 933,604

[22] Filed: Aug. 14, 1978

[30] Foreign Application Priority Data

Aug. 15, 1977 [GB] United Kingdom ............... 34214/77

[51] Int. Cl.² ............................................. H05B 1/02
[52] U.S. Cl. ................................... 219/501; 219/492; 219/505; 219/508; 219/212
[58] Field of Search ............... 219/501, 494, 492, 506, 219/508, 504, 499, 212, 549, 505; 323/225 C

[56] References Cited

U.S. PATENT DOCUMENTS

| | | | |
|---|---|---|---|
| 2,831,099 | 4/1958 | Crowley | 219/494 X |
| 3,789,190 | 1/1974 | Orosy et al. | 219/499 |
| 3,814,899 | 6/1974 | Gordon, Jr. et al. | 219/494 |
| 3,920,955 | 11/1975 | Nakata | 219/494 |

FOREIGN PATENT DOCUMENTS

| | | | |
|---|---|---|---|
| 793783 | 4/1958 | United Kingdom | 219/494 |
| 804086 | 11/1958 | United Kingdom | 219/494 |

*Primary Examiner*—B. A. Reynolds
*Assistant Examiner*—M. Paschall
*Attorney, Agent, or Firm*—Mason, Fenwick & Lawrence

[57] ABSTRACT

A heating circuit comprises input terminals for connection to an AC supply, an elongate heating conductor and a switch connected in series between the input terminals, a switch control operative to close the switch to cause AC current to flow from the supply through the heating conductor, an elongate sensor conductor spaced from the heating conductor, and a temperature sensitive element disposed between the heating and sensor conductors and responsive to over-heating at any position along the length of the heating conductor to drop substantially in impedance at that position to connect the sensor conductor to the potential of the heating conductor at that position. The heating circuit further comprises a voltage detector to cause the control, while the control is operative to close the switch, to periodically open the switch so that the heating conductor is at substantially the same potential along its length, and a sensor to sense the potential on the sensor conductor during each periodic opening of the switch and responsive to the potential being such as to indicate that there is an overheat at any position along the length of the heating conductor to prevent subsequent re-closure of the switch. Periodically switching off the switch and sensing the potential on the sensor conductor at that time enables reliable detection of localized overheating at any position along the length of the heating conductor, because due to the heating conductor not passing heating current there is no voltage drop along its length.

10 Claims, 1 Drawing Figure

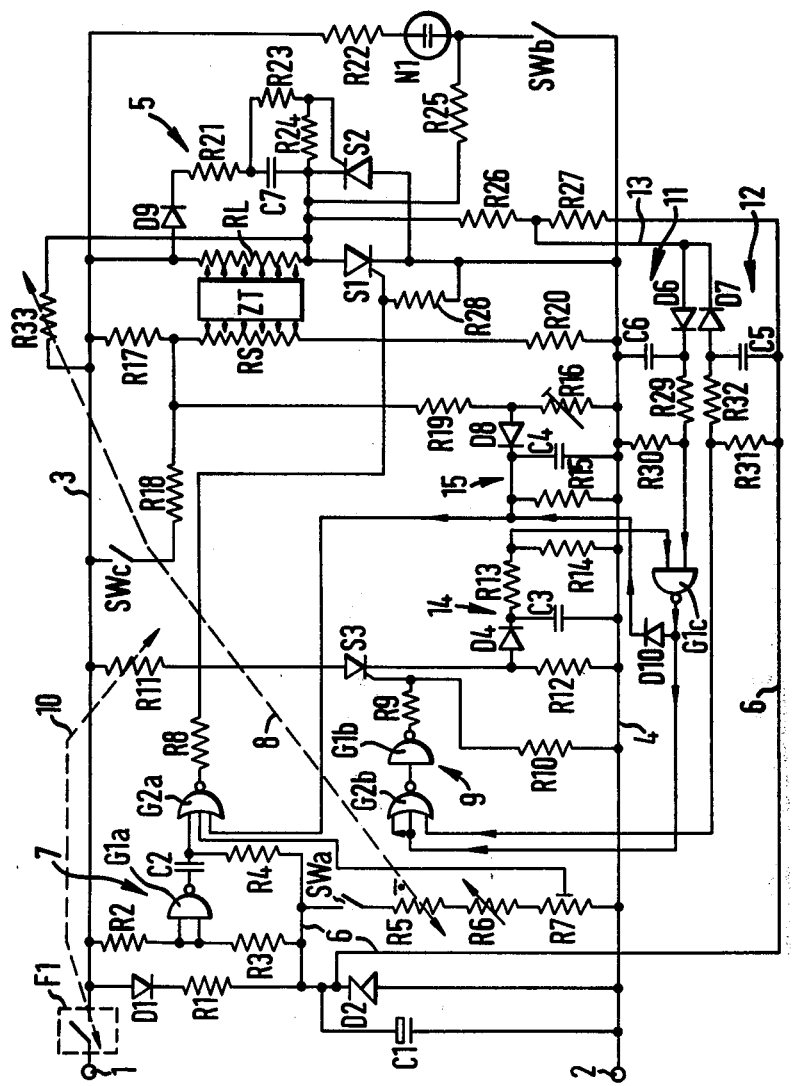

HEATING CIRCUITS FOR DETECTION OF LOCALIZED OVERHEATING

BACKGROUND OF THE INVENTION

1. Field of the Invention

This invention relates to heating circuits and particularly, but not exclusively, to heating circuits suitable for heating electrically heated blankets or pads.

2. Description of the Prior Art

It is known to heat an electric blanket or pad by means of a heating circuit comprising an elongate heating conductor and switch means (for example a thyristor or a mechanical switch) connected in series with the heating conductor between input terminals for connection to an electrical supply, in particular an AC supply, switch control means (for example an electronic control circuit or a bimetallic strip) operative to close the switch means to cause current to flow from the supply through the heating conductor, an elongate sensor conductor spaced from the heating conductor, and temperature sensitive means disposed between the heating and sensor conductors whereby its impedance drops in the event of overheating. Any such drop in impedance can be sensed and used to disable the supply of current to the heating conductor.

The current through the heating conductor may be DC (for example half-wave rectified AC if the switch means is a single thyristor) or it may be AC. If the current is AC, then while the blanket is calling for heat AC current will continually flow through the heating conductor. If overheating occurs, while it is generally possible to detect this if the overheating is general, that is to say if it occurs along the length of the temperature sensitive means, a problem arises if, as is likely, the overheating is localised at a position along the length of the temperature sensitive means. The reason for this is that, since current continuously flows through the heating conductor when the switch is closed, there is a voltage gradient along its length. Thus, if the sensing of overheating is conducted by monitoring the potential on the sensor conductor due to the localised impedance drop, the potential will vary substantially in accordance with the location of the overheat and it therefore becomes difficult to detect overheating at certain positions.

Naturally, it has in the past been thought essential to monitor the impedance whilst the switch means is closed since only then, of course, will overheating occur. The approach to solving the above problem in the past, as can be seen from UK Pat. No. 793,783 and US Pat. No. 2,831,099, has therefore been to evolve circuits for monitoring the impedance of the temperature sensitive means whilst the switch means is closed.

SUMMARY OF THE INVENTION

An object of the present invention is to provide a heating circuit of the type generally set forth above in which localised overheating can be detected during a period in which the switch means is closed to pass AC current through the heating conductor and in which the reliability of detection of a localised overheat is just as good as if current were not passing through the heating conductor whereby there would be no voltage gradient along it.

This object is achieved, in accordance with the invention, by the provision of means to cause the switch control means, while the control means is operative to close the switch means, to periodically open the switch means (for example for a short period of about 50 milliseconds about very one second) so that the heating conductor is at substantially the same potential along its length. The potential on the sensor conductor is sensed during each periodic opening of the switch means. Sensing the potential on the sensor conductor during each periodic opening of the switch means enables reliable detection of localised overheating at any position along the length of the heating conductor, because due to the heating conductor not passing heating current there is no voltage drop along its length.

The switch means may be of any suitable type, preferably solid state. The switch means may comprise a pair of inversely connected thyristors. The thyristors may be in a master/slave configuration, the switch control means being arranged to supply firing pulses to one of the thyristors to fire it during supply half-cycles of one polarity and the switch means including means to slave trigger the other thyristor into conduction at the commencement of the subsequent half-cycles of the opposite polarity. This arrangement simplifies the design of the switch control means, thereby making it more reliable, and also provides good resistance to potential reverse voltage breakdown damage of the thyristors.

The heating circuit may further comprise a shunt switch connected in parallel with the heating conductor and switch means, a voltage detector means arranged to monitor the voltage across the switch means, the voltage detector means being responsive during the periodic opening of the switch means to turn the shunt switch on only for the periodic opening duration to establish a voltage for enabling subsequent operation of the switch control means if the monitored voltage is such as to indicate that the switch means is in fact open and to turn it on continually if the monitored voltage is substantially zero, and disabling means responsive to continual turning on of the shunt switch to disable operation of the heating circuit.

In this way, periodic closure of the shunt switch is essential to correct operation of the heating circuit, and a short circuit failure of the switch means, which leads to a substantially zero voltage across the switch means when it is supposed to be switched off, continually switches on the shunt switch to cause the heating circuit to be disabled.

The disabling means may comprise a resistor in series with the shunt switch, may be a thyristor, and thermally connected to a thermal fuse in series with the heating conductor, the dissipation in the resistor being sufficient to operate the thermal fuse only if the switch is turned on continually.

The heating and sensor conductors and the temperature sensitive means are preferably constituted by a unitary heating cable. For example, the temperature sensitive means may comprise a layer disposed around the heating conductor with the sensor conductor wound around the layer so as to be coaxial of the heating conductor. It is within the scope of the invention, however, for the heating and sensor conductors not to be formed as parts of a common cable.

Heating circuits in accordance with the invention are particularly applicable to heating some object or medium by means of a heating cable. The heating cable may be used, for example, in pipe warming, industrial process heating or in space heating, for instance in ceiling heating or underfloor heating. The invention is, however, especially applicable to the heating of an electric blanket, which term is to be deemed to encompass not only electrically-heated overblankets, but also electrically-heated underblankets and electrically-heated pads.

BRIEF DESCRIPTION OF THE DRAWING

The invention will now be further described, by way of example, with reference to the accompanying drawing, the sole FIGURE of which is a circuit diagram of an electric blanket heating circuit in accordance with the invention.

DETAILED DESCRIPTION OF THE PREFERRED EMBODIMENT

Referring now to the drawing, the illustrated heating control circuit has a pair of input terminals 1, 2 for connection to the live and neutral conductors of an AC mains supply (not shown). Connected to the terminals 1, 2 respectively are live and neutral "rails" 3 and 4, respectively. A thermal fuse F1 is connected in series with the live rail 3 adjacent the live input terminal 1. As will be known to those skilled in the art, the thermal fuse F1 is a non-resettable thermal link and comprises a current carrying device (generally incorporating a low melting point alloy) responsive to the application of external heat to non-resettably stop the passage of current therethrough.

A heating conductor RL and a power switch network shown generally at 5 and described in more detail hereinbelow are connected in series between the rails 3 and 4, and therefore between the AC mains supply input terminals 1 and 2.

The heating conductor RL forms part of a dual concentric heating cable, for example of the form disclosed in UK Patent Specification No. 804 086, and serves as a heating element of an electric blanket. The cable comprises the heating conductor RL and a sensor conductor RS which surrounds the heating conductor. Disposed between the two conductors, throughout the length of the cable, is a polyvinyl chloride (PVC) material which is schematically shown in the drawing as having an impedance ZT. The sensor conductor RS is in fact wound around the PVC material. The PVC material has resistance and capacitance and, as explained below, the impedance of the material is monitored. The PVC material may or may not be doped with a substance which enhances its conductivity. The PVC material, whether loaded or not, is essentially an insulator at room temperature, but its impedance decreases with temperature such that at elevated temperatures a control function can be achieved. These temperatures may for instance be attained during the normal course of pre-heating a bed when the whole length of heating cable is uniformly raised in temperature to a predetermined level, or from localised overheating of a short length of heating cable brought about by a ruck in the blanket or a twist in the heating element.

The power switching network 5 comprises a pair of thyristors S1 and S2 inversely connected in master/slave relationship. The network 5 further comprises a diode D9, resistors R21, R23 and R24, and a capacitor C7.

Connected between the rails 3 and 4 is an internal DC power supply constituted by a diode D1, a resistor R1, a smoothing capacitor C1 and a Zener diode D2. In use, the DC power supply generates +5 V on a +5 V DC supply rail 6.

The illustrated heating circuit further comprises a zero crossing pulse generator shown generally at 7. The zero-crossing pulse generator 7 comprises resistors R2, R3 and R4, a capacitor C2, and a two-input NAND gate G1a. The resistors R2 and R3 form a potential divider network connected between the live mains rail 3 and the +5 V DC power supply rail 6. The junction of the resistors R2 and R3 is connected to the two inputs of the gate G1a, which are coupled together. The capacitor C2 and the resistor R4 act as a differentiator.

Another component of the illustrated circuit is a gate/driver stage for the power switching network 5. The gate/driver stage comprises a three-input NOR gate G2a and resistors R8 and R28, the resistors being connected to the thyristor S1 of the power switching network 5 as illustrated.

The differentiator C2/R4 of the zero-crossing pulse generator 7 is generated to one input of the gate G2a.

A second input of the gate G2a is connected to the slider of a preset potentiometer R7 which, together with an adjustable resistor R6 and a negative temperature coefficient (NTC) thermistor R5, constitutes a normal temperature control arrangement in the form of a potential divider connected between the +5 V DC power supply rail 6 and the neutral rail 4.

The termistor R5 is thermally coupled to a resistor R33 as depicted by a dotted line 8. The resistor R33 is in parallel with the heating conductor RL and subjected to the ambient temperature, whereby the dissipation therein, and therefore the temperature to which the thermistor R5 is heated, is proportional to the dissipation in the heating conductor RL and also to the ambient temperature.

The series combination of a resistor R11, a thyristor S3 and a resistor R12 is connected between the supply rails 3, 4 and therefore in parallel with the series combination of the heating conductor RL and the power switching network 5. The thyristor S3 is provided with a gate/driver stage comprising a three-input NOR gate G2b, a NAND gate G1b acting as an inverter, and resistors R9 and R10.

The resistor R11 is thermally coupled to the thermal fuse F1 as indicated by a dotted line 10.

A pair of voltage detector networks 11 and 12 are each connected to a line 13 connected to the junction of a pair of resistors R26 and R27 connected in series between the anode of the thyristor S1 and the +5 V DC supply rail 6. The voltage detector network 11 comprises a diode D6, a capacitor C6 and resistors R29 and R30, the output of the network being connected to one input of a two-input NAND gate G1c. The output of the gate G1c is connected to a first pair of inputs of the gate G2b, which are coupled together, and also, via a diode D10, to the third input of the gate G2a.

The voltage detector network 12 comprises a diode D7, a capacitor C5 and resistors R31 and R32, the output of the network being connected to the third input of the gate G2b.

The illustrated heating circuit further comprises another voltage detector network shown generally at 14. The network 14 comprises the resistor R12, a diode D4, a capacitor C3 and resistors R13 and 14, the output of the network being connected to the second input of the gate G1c.

A further component part of the illustrated heating circuit is an overtemperature control arrangement which comprises resistors R17 and R20, together with a further voltage detector network 15. The resistors R17 and R20 are connected in series with the sensor conductor RS, as shown, between the live and neutral rails 3 and 4. The voltage detector network 15 comprises a fixed resistor R19 and a preset variable resistor R16 connected across the series combination of the sensor conductor RS and the resistor R20, together with a peak detector constituted by a diode D8, a capacitor C4 and a resistor R15, the output of the detector being connected to the third input of the gate G2a.

The illustrated circuit finally comprises, connected as shown, resistors R18, R22 and R25, a neon indicator lamp N1, and three ganged sets of contact SWa, SWb and SWc operated by a test button (not shown), the contact set SWa and SWb being normally closed and the contact set SWc being normally open.

The illustrated heating circuit functions in the following manner. Assume that the circuit is not connected to the AC supply and that the blanket is cold. Consider then what happens when the AC supply is connected to the input terminals 1 and 2. The power supply circuit generates the internal +5 V DC supply on the rail 6. When the main voltage first passes upwardly through zero, the linked inputs of the gate G1a pass through +2.5 V (50% of the internal DC supply) causing the output of the gate G1a to go low. The resultant negative-going edge is applied by the differentiator C2/R4 to the first input of the gate G2a, whereby the first input of the gate G2a goes low for approximately 100 microseconds. Provided there are no inhibit levels on either of the other two inputs of the gate G2a, the output of the gate G2a goes positive driving current into the gate of the thyristor S1 via the resistor R8, thereby turning on the thyristor S1 whereby it conducts throughout the following positive half-cycle of the mains supply and passes current through the heating conductor RL, thereby heating the blanket. (The resistor R28 provides a low impedance between the gate and cathode of the thyristor S1 to minimize the possibility of self-triggering of the thyristor S1).

The result of the thyristor S1 being triggered on at the beginning of a positive half-cycle of the mains is that the voltage developed across the heating conductor RL causes the capacitor C7 of the power switching network 5 to charge up via the diode D9 and the resistor R21 to a positive potential. At the end of the positive half-cycle, when the supply current goes downwardly through zero, the thyristor S1 is reverse biassed and therefore switches off and the thyristor S2 becomes forward biassed. The positive charge stored in the capacitor C7 now flows through the resistor R23 into the gate of the thyristor S2 thereby triggering the thyristor S2 into conduction during the negative half-cycle. Thus, for every positive half-cycle conduction of the thyristor S1, which can be considered to be a master thyristor, the thyristor S2, which can be considered to be a slave thyristor, is slave triggered into conduction during the subsequent negative half-cycle. As a result of this, the number of positive and negative half-cycles passing through the heating conductor RL are always equal.

The functioning of the voltage detector networks 11, 12 and 14 will now be described. The object of the voltage detector networks 11, 12 and 14 is to determine whether or not each of the thyristors S1, S2 and S3 respectively is or is not conducting or, to put it another way, to detect whether the thyristor has failed either open circuit or short circuit.

The voltage existing across the thyristors S1 and S2 is divided in potential by the resistors R26 and R27. As will now be described, if the positive and/or negative voltage across either of S1 and S2 is zero, implying a short circuit failure of one or both of them, the thyristor S3 is turned on continually thereby causing the thermal fuse F1 to blow and thereby isolating the heating circuit from the mains supply.

In normal operation, if the thyristor S1 is not conducting, the capacitor C6 charges up via D6, RL and R26 during positive half-cycles of the supply voltage, driving the associated input of the NAND gate G1c high. Assuming that the thyristor S3 is functioning correctly (see below), the other input of the gate G1c is also high so that the output of the gate G1c goes low, thereby disabling the gate G2b and enabling the third input of the gate G2a via the diode D10, whereby the thyristor S1 is turned on. When the thyristor S1 turns on, the capacitor C6 discharges towards zero via the resistors R29 and R30. The values of the capacitor C6 and the resistors R29 and R30 are such that, approximately 1 second after the thyristor S1 turns on, the detector 11 is operative on the NAND gate G1c to cause its output to go high inhibiting the gate G2a and hence stopping further firing of the thyristor S1. When S1 is turned off the capacitor C6 charges up again via D6, RL and R26, to drive the associated input of the gate G1c high whereby, as explained above, the thyristor S1 is turned on again, the values of RL and R26 being such that the thyristor S1 is off for about 50 milliseconds. Each time that the output of G1c goes high or low the thyristor S3 is switched on or off, respectively, via the gates G2b and G1b, whereby the thyristor S3 is on or off whilst the thyristor S1 is off or on, respectively. Thus, during normal operation, and assuming that the blanket has still not heated up to the operating temperature, the thyristors S1 and S2 conduct continually throughout respective alternate half-cycles of the supply voltage to heat up the heating conductor RL, except that for a short period of about 50 milliseconds, occurring periodically every one second, the thyristors S1 and S2 are temporarily turned off for 50 ms and the thyristor S3 is temporarily turned on for 50 ms.

The voltage detector network 12 functions in a similar manner to the voltage detector network 11. Thus, the capacitor C5 is normally charged negatively via the diode D7, RL and R26 during negative half-cycles of the supply voltage, causing the third input of the gate G2b to be normally low.

If either of the thyristors S1 and S2 fails short circuit, whereby when they are turned off the voltage across them is zero, the voltage detector network 11 or 12, respectively, will fail to disable the gate G2b at the end of the next 50 ms off period following failure. Consequently, the thyristor S3 will be held continually on. During normal operation, since the thyristor S3 conducts with a duty cycle of about 5%, the heat developed in the resistor R11 is less than ¼ watt. However, if due to a short circuit failure of either of the thyristors S1 or S2 the thyristor S3 is biassed continually on, the dissipation in R11 increases to about 3 watts, whereby the thermal fuse F1 is actuated and disconnects the heating circuit from the supply.

Turning now to the voltage detector network 14, provided that, as explained above, the thyristor S3 conducts only for about 5% of the time, a positive bias is established across the capacitor C3 which keeps one input of the NAND gate G1c high and allows the system to cycle every one second as explained above. If, however, the thyristor S3 were to fail short circuit, the thermal fuse F1 will blow due to the increased dissipation in the resistor R11. If, on the other hand, the thyristor S3 were to fail open circuit, no DC bias would be established across the capacitor C3 and the gate G2a would be inhibited thereby stopping the supply of heating current to the heating conductor RL.

As explained above, the voltage detector networks 11 and 12 are provided to respectively sense short circuit failure of the thyristors S1 and S2. (The network 11 also functions, again as explained above, to cause the periodic switching off of the thyristors S1 and S2 for 50 ms every one second.) It will be appreciated, however, that if the thyristor S1 goes short circuit, the thyristor S2 is also slave triggered into conduction whereby strictly speaking only detection of short circuit failure of the thyristor S2 is necessary. However, provision of both the voltage detector networks 11 and 12 has the following advantage. If both networks were not provided, in the event that S2 failed open circuit, a subsequent short circuit failure of the thyristor S1 would go undetected. The provision of both of the detector networks 11 and 12 will detect a short circuit failure of either of the thyristors S1 and S2 and also an open circuit failure of the thyristor S2 followed by a short circuit failure of the thyristor S1.

As the blanket heats up, so also does the resistor R33. Eventually, the consequent reduction in the resistance of the thermistor R5 causes the voltage applied to the second input of the gate G2a to rise to a value which will inhibit the gate G2a, whereby no firing pulses are supplied to the power switching network 5 whereby power stops from flowing through the heating conductor RL. No current flows until the heater resistor R33, and thus the thermistor R5, has cooled down sufficiently for the gate G2a to be enabled again. Thus, the thermistor R5 and the resistors R6, R7 and R33 act as a normal temperature control arrangement to switch the supply on and off from time to time to enable a desired temperature to be maintained. The desired temperature can be varied by manually adjusting the value of the resistance of the adjustable resistor R6.

The functioning of the overtemperature control arrangement described above will now be explained.

As the heating cable warms up, the impedance ZT of the PVC material between the heater conductor RL and sensor conductor RS falls logarithmically. This causes a corresponding increase in the voltage developed across the resistor R20. This voltage is tapped down by the high resistance potential divider constituted by the resistors R19 and R16 and peak detected by the voltage detector network 15. Should the temperature of the element reach a predetermined excessive value, set as desired by the value of the preset adjustable resistor R16, the voltage level developed across the resistor R15 inhibits the gate G2a, thereby preventing the thyristors S1 and S2 from being triggered into conduction until the temperature has dropped.

It will thus be seen that a general overheating of the blanket heating element causes an inhibit level to be directly applied to the gate G2a, regardless of the correct functioning of any other part of the control circuit.

The overtemperature control arrangement also acts to ensure that heating is discontinued if a localised overheating of the PVC material occurs at any position along the length of the heating conductor RL. As explained above, the thyristors S1 and S2 are turned off for a short period every one second. As a consequence, during this off period the whole of the heating conductor or winding RL is at substantially the same potential, that is to say that the mains voltage is not dropped across the heating conductor RL as it is when the thyristors S1 and S2 are on. Thus, regardless of where along the length of the heating conductor RL such a localised overheat should occur, during the next off period the potential on the heating conductor RL conducted through the impedance ZT to the sensor conductor RS is effective on the voltage detector 15 to ensure that the gate G2a is inhibited until sufficient cooling has taken place to remove the local overheat. Thus, for example, even if a localised overheat (caused for example by a blanket ruck or twisted element wire or by arcing across a break in the heating conductor) should occur at the end of the heating conductor RL near the thyristors S1 and S2, further heating will be discontinued. In this connection it is pointed out that a local overheat at this end of the wire would not be detected with the thyristors S1 and S2 turned on, since in this case the potential at this end of the wire would be substantially that of the neutral rail 4.

In summary, the overtemperature control arrangement senses the impedance between the sensor conductor RS and load conductor RL to provide both general overheat protection and localised overheat protection, the latter being achieved regardless of the position of the overheat along the heating conductor, by periodically switching off the supply of heating current and sensing the potential on the sensor conductor.

It is desirable that a break in the sensor element RS should prevent further operation of the heating circuit. The resistor R17 fulfils this function since, if a break in the sensor conductor occurs, the resistor R17 causes an inhibit voltage to be applied to the gate G2a via the diode D8.

Depressing the above-described test button:

(i) closes the contact set SWc to simulate an overheat by putting the resistor R18 between the heating conductor RL and sensor conductor RS;

(ii) opens the contact set SWa so that the normal temperature control arrangmement effectively demands full power; and (iii) opens the contact set SWb to connect the neon indicator lamp N1 across the heating conductor RL in series with the resistors R22 and R25.

If the system is functioning correctly, the result of pressing the test button is that the overtemperature control actuation provided by insertion in circuit of R18 will override the normal temperature control enable function, causing the thyristors S1 and S2 to turn off. The neon indicator lamp N1 will go out.

The operation of the heating circuit described above may be summarised as follows. AC power is switched to the heating conductor RL via the inversely connected thyristors S1 and S2 which are triggered near the zero-crossing points of the supply voltage, which minimises the generation of radio frequency interference. While heating is called for by the normal temperature control arrangement, the power to the heating conductor is shut off for a short period every second. During the off period, the following three functions are carried out. Firstly, with the heating conductor RL at a uniform potential along its length, the potential on the sensor conductor RS, which will vary with the impedance ZT of the PVC material, is sensed, whereby the impedance ZT and therefore the temperature of the PVC material is monitored. If the impedance ZT is too low, whether this is due to general or localised overheating, further firing of the thyristors S1 and S2 is inhibited. Secondly, the shunt protection thyristor S3 is turned on, leading to the establishment via the detector 14 of a voltage which enables firing of the thyristors S1 and S2 for a further period. Thirdly, the voltage appearing across the thyristors S1 and S2 are monitored and, if the positive or negative voltage across the thyristor is zero, implying short circuit failure of one or both of them, the shunt protection thyristor S3 is continually fired so that the resistor R11 heats up sufficiently to blow the thermal fuse F1 to isolate the heating circuit from the mains supply.

The heating circuit described above is very highly fail safe. Both the normal temperature control and the general overtemperature control functions act directly on the gate G2a. If either or both of the thyristors S1 and S2 fail to turn off every second, one or both of the voltage detector networks 11 and 12 is operative on the thyristor S3 to cause the thermal fuse F1 to blow. Similarly, if the thyristors S1 and S2 are continually triggered on, for example due to a failure of the gate G2a or of either of the thyristors, one or both of the voltage detector networks 11 and 12 will independently cause the thermal fuse F1 to blow. Further, failure of any part of the shunt protection arrangement comprising the thyristor S3 and the associated circuitry causes either the thermal fuse F1 to blow or the drive to the thyristors S1 and S2 to be disabled. Should the regulation of the DC power supply circuit fail due to an open circuit of the capacitor C1 or a gate failure causing an unduly high current consumption, then because of the DC coupling between the gates G2b and G1b and the thyristor S3, the latter tends to turn on for a very much higher duty cycle whereby the fuse F1 is blown. The various gates in the circuits disclosed above are C/MOS gates of proven reliability which are completely buffered against mains transients and work from a stabilised DC supply of less than 30% of the manufacturers maximum recommended rating. The thyristors S1 and S2 are rated at 400 V and 4 amps mean current, driving a resistive load, the maximum rms current through either device being less than 0.5 amps. The use of back-to-back (inversely connected) thyristors minimise potentially dangerous reverse voltage breakdown, since one device is always forward biassed for a voltage transient of either polarity.

Suitable values for the components in the accompanying circuit diagram are given below, all capacitance values being in microfarads.

| R1 | 100K | R23 | 100K |
|---|---|---|---|
| R2 | 3.3M | R24 | 1K |
| R3 | 3.3M | R25 | 270K |
| R4 | 100K | R26 | 270K |
| R5 | 7K (nominal) | R27 | 47K |
| R6 | 0 to 22 K | R28 | 1.5K |
| R7 | 100K | R29 | 10M |
| R8 | 4.7K | R30 | 3.3M |
| R9 | 4.7K | R31 | 10M |
| R10 | 1.5K | R32 | 10M |
| R11 | 20K | R33 | 330K |
| R12 | 1K | | |
| R13 | 10M | | |
| R14 | 10M | C1 | 100 |
| R15 | 10M | C2 | 0.01 |
| R16 | 0 to 100K | C3 | 0.1 |
| R17 | 270K | C4 | 0.01 |
| R19 | 3.3M | C5 | 0.1 |
| R20 | 68K | C6 | 0.047 |
| R21 | 100K | C7 | 0.047 |
| R22 | 270K | | |

I claim:

1. A heating circuit comprising input terminals for connection to an AC supply, an elongate heating conductor and switch means connected in series between the input terminals such that one end only of the heating conductor is connected to the input terminals via the switch means, switch control means operative to close the switch means to cause AC current to flow from the supply through the heating conductor, an elongate sensor conductor spaced from the heating conductor, temperature sensitive means disposed between the heating and sensor conductors and responsive to overheating at any position along the length of the heating conductor to drop substantially in impedance at that position to connect the sensor conductor to the potential of the heating conductor at that position, means to cause the control means, whilst the control means is operative to close the switch means, to periodically open the switch means so that the heating conductor is at substantially the same potential along its length, and sensing means to sense the potential on the sensor conductor during each periodic opening of the switch means and responsive to the potential being such as to indicate that there is an overheat at any position along the length of the heating conductor to prevent subsequent re-closure of the switch means.

2. A heating circuit according to claim 1, wherein the switch means is a solid state switch means.

3. A heating circuit according to claim 2, wherein the switch means comprises a thyristor.

4. A heating circuit according to claim 3, wherein the switch means comprises a pair of inversely connected thyristors.

5. A heating circuit according to claim 4, wherein the pair of thyristors are in a master/slave configuration, the switch control means being arranged to supply firing pulses to one of the thyristors to fire it during supply half-cycles of one polarity and the switch means including means to slave trigger the other thyristor into conduction at the commencement of the subsequent half-cycles of the opposite polarity.

6. A heating circuit according to claim 1, comprising a shunt switch connected in parallel with the heating conductor and switch means, a voltage detector means arranged to monitor the voltage across the switch means, the voltage detector means being responsive during the periodic opening of the switch means to turn the shunt switch on only for the periodic opening duration to establish a voltage for enabling subsequent operation of the switch control means if the monitored voltage is such as to indicate that the switch means is in fact open and to turn it on continually if the monitored voltage is substantially zero, and disabling means responsive to continual turning on of the shunt switch to disable operation of the heating circuit.

7. A heating circuit according to claim 6, wherein the shunt switch comprises a thyristor.

8. A heating circuit according to claim 6, wherein the disabling means comprises a resistor in series with the shunt switch and thermally connected to a thermal fuse in series with the heating conductor, the arrangement being such that the dissipation in the resistor is sufficient to operate the thermal fuse only if the switch is turned on continually.

9. A heating circuit according to claim 1, wherein the heating and sensor conductors and the temperature sensitive means are constituted by a unitary heating cable.

10. A heating circuit according to claim 9, wherein the temperature sensitive means comprises a layer disposed around the heating conductor with the sensor conductor wound around the layer so as to be coaxial of the heating conductor.

* * * * *